(Model.)
A. KIMBLE.
WAGON AXLE.
No. 274,341. Patented Mar. 20, 1883.
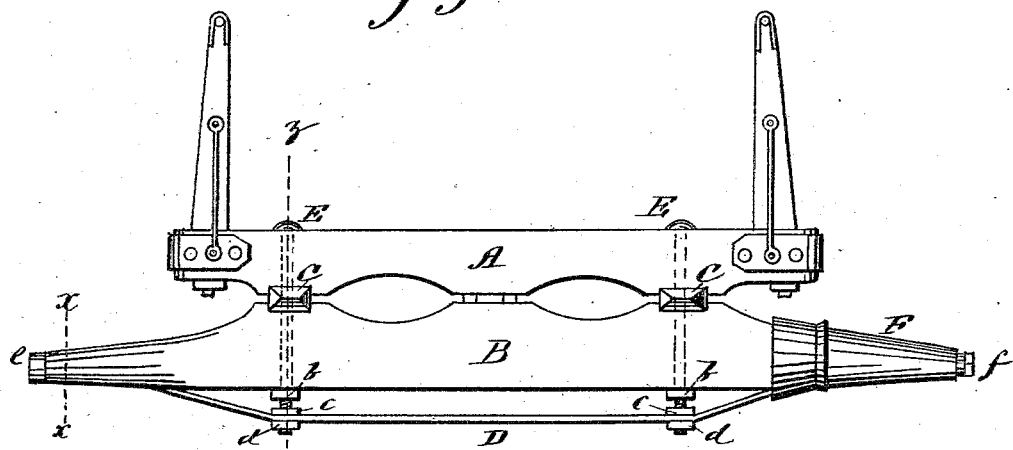
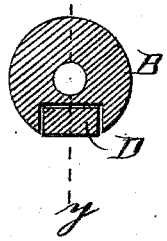
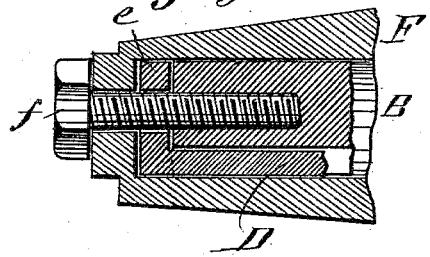
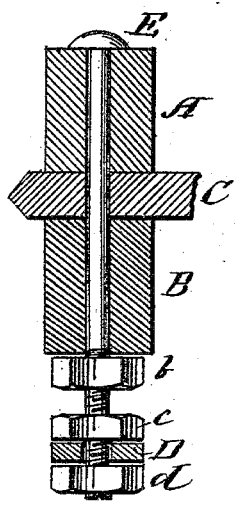
WITNESSES:
Chas. T. Howell,
C. Sedgwick
INVENTOR:
A. Kimble
BY Munn & Co.
ATTORNEYS.

UNITED STATES PATENT OFFICE.

ANDREW KIMBLE, OF MOUNDSVILLE, WEST VIRGINIA.

WAGON-AXLE.

SPECIFICATION forming part of Letters Patent No. 274,341, dated March 20, 1883.

Application filed December 28, 1882. (Model.)

*To all whom it may concern:*

Be it known that I, ANDREW KIMBLE, of Moundsville, in the county of Marshall and State of West Virginia, have invented certain new and useful Improvements in Wagon-Axles, of which the following is a full, clear, and exact description.

This invention consists in certain combinations, with a wagon-axle and with the bolster and hound thereof, of a truss-bar turned up at its outer ends and secured in position, together with the skeins on the axle, by end screws passing into the axle, also connected by bolts and tightening-nuts with the bolster, hound, and axle, substantially as hereinafter described, whereby the axle is restrained from upbreak and the truss-bar from becoming loose at its ends.

Reference is to be had to the accompanying drawings, forming part of this specification, in which similar letters of reference indicate corresponding parts in all the figures.

Figure 1 represents a longitudinal side view of a wagon-axle and bolster with the truss-bar, hounds, and certain fastenings applied, all in accordance with my invention, one of the skeins on the axle and screw used to hold it and truss-bar in place being removed. Figs. 2, 3, and 4 are views, upon a larger scale, of the same in part, Fig. 2 being a transverse section on the line $xx$ in Fig. 1; Fig. 3, a longitudinal section on the line $yy$ in Fig. 2, with the skein applied; and Fig. 4, a transverse section on the line $zz$ in Fig. 1.

A in the drawings indicates the bolster, B the axle, and C the hound, of a wagon.

D is the truss-bar.

E E are bolts arranged to pass through the bolster, hound, and axle, also through the truss-bar. Nuts $b\ b$ are fitted on these bolts on the under side of the axle to hold the bolster, hound, and axle together, and outside of these nuts on said bolts, between the axle and the truss-bar, are fitted other nuts, $c\ c$, for tightening or straining the truss-bar by screwing said nuts $c\ c$ downward or outward. Jam-nuts $d\ d$ are also applied to the outer or lower ends of the bolts E E, to hold the nuts $c\ c$ in their place after the truss-bar has been tightened up as required.

The truss-bar D extends out on the under side of the axle, and is flat so as to fit near its outer ends on the under side of the axle or to lie within a shallow groove therein, and its extreme outer ends, $e$, are turned up over the ends of the axle in such manner or to such an extent as will admit of the skeins F fitting over them and the end portions generally of the truss-bar. The turned-up ends $e$ of the truss-bar are perforated to receive through them wood or lag screws $f$, which serve the double purpose of holding on the skeins F and the truss-bar D to its place.

This construction and combination of parts has many advantages over others for a like purpose. Thus it is superior to other arrangements in which a truss-rod applied to the axle is arranged to penetrate the axle from its under side to an extent that will weaken it, resting on blocks within the axle, and to pass out through the center of each end of the axle, where a nut is screwed onto it to hold on the skein and to tighten the truss-rod. Under such previous arrangement, in order to tighten the skeins and truss-rod, the nuts on the ends of said rod require to be screwed up so close or hard that not only are the threads on the ends of the truss-rods liable to strip and the nuts to come off, but the axle is liable to break in an upward direction almost immediately inside of the inner ends of the skeins when the wheel of the wagon to which the axle is applied strikes an obstacle in its path. This is avoided by my construction and combination of parts.

Having thus described my invention, what I claim as new, and desire to secure by Letters Patent, is—

1. The combination, with the bolster A, the hound C, and the axle B, of the truss-bar D, having turned-up outer end portions, $e$, and the bolts E, passing through the bolster, hound, axle, and truss-bar, and provided with the nuts $b\ c\ d$, the nut $b$ being on the under side of the axle and the nuts $c\ d$ on opposite sides of the truss-bar, substantially as herein shown and described.

2. The combination, with the bolster A, the hound C, and the axle B, of the truss-bar D, having turned-up outer end portions, $e$, the bolts E, passing through the bolster, hound, axle, and truss-bar, and provided with the nuts $b\ c\ d$, the skeins F, and the screws $f$, substantially as herein shown and described.

ANDREW KIMBLE.

Witnesses:
 W. B. HUMPHREYS,
 L. R. SAMMONS.